United States Patent
Heinke

(10) Patent No.: US 9,228,838 B2
(45) Date of Patent: Jan. 5, 2016

(54) THERMAL IMAGING CAMERA WITH COMPASS CALIBRATION

(75) Inventor: Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 809 days.

(21) Appl. No.: 13/331,840

(22) Filed: Dec. 20, 2011

(65) Prior Publication Data

US 2013/0155188 A1    Jun. 20, 2013

(51) Int. Cl.
*H04N 5/33* (2006.01)
*H04N 13/02* (2006.01)
*G01C 17/38* (2006.01)

(52) U.S. Cl.
CPC ....................................... *G01C 17/38* (2013.01)

(58) Field of Classification Search
CPC ........................................................ H04N 5/33
USPC .................................................... 348/46, 135
See application file for complete search history.

(56) References Cited

U.S. PATENT DOCUMENTS

| 5,090,231 | A | 2/1992 | Gallagher |
| 5,187,872 | A | 2/1993 | Dufour |
| 5,694,037 | A | 12/1997 | Palstra et al. |
| 6,192,196 | B1 | 2/2001 | Keller |
| 6,408,251 | B1 | 6/2002 | Azuma |
| 7,012,551 | B2 | 3/2006 | Shaffer |
| 7,225,060 | B2 | 5/2007 | O'Connor et al. |
| 7,451,549 | B1 | 11/2008 | Sodhi et al. |
| 7,835,879 | B2 | 11/2010 | Vocali et al. |
| 7,872,593 | B1 | 1/2011 | Rauscher et al. |
| 7,905,026 | B2 | 3/2011 | Martikka et al. |
| 2006/0072014 | A1 | 4/2006 | Geng et al. |
| 2008/0058656 | A1* | 3/2008 | Costello et al. ............... 600/508 |
| 2009/0125234 | A1 | 5/2009 | Geelen et al. |
| 2009/0141966 | A1 | 6/2009 | Chen et al. |
| 2009/0254294 | A1 | 10/2009 | Dutta |
| 2010/0191541 | A1* | 7/2010 | Prokoski ........................... 705/2 |
| 2011/0102580 | A1 | 5/2011 | Langdon |
| 2011/0106474 | A1 | 5/2011 | Kulik et al. |
| 2012/0182427 | A1* | 7/2012 | Marshall ........................ 348/159 |
| 2012/0285274 | A1* | 11/2012 | Almalki et al. .............. 73/866.3 |

OTHER PUBLICATIONS

ST Microelectronics, AN3182 Application Note, Apr. 2010 (18 pages).
Freescale Semiconductor, Implementing a Tilt-Compensated eCompass using Accelerometer and Magnetometer Sensors, Application Note—Document No. AN4248, Rev. 3 Jan. 2012 (21 pages).

* cited by examiner

*Primary Examiner* — Thai Tran
*Assistant Examiner* — Nien-Ru Yang
(74) *Attorney, Agent, or Firm* — Fredrikson & Byron, P.A.

(57) ABSTRACT

A thermal imaging camera may include an electronic compass that can be calibrated after assembly of the thermal imaging camera. The electronic compass may include a magnetic sensor configured to sense three orthogonal components of a magnetic field. In some examples, the camera includes a processor configured to receive a plurality of measurements from the magnetic sensor as a physical orientation of the magnetic sensor is changed in a three-dimensional space. The processor may generate a plurality of data points from the plurality of measurements and control a display so as to display a simulated three-dimensional plot of the data points. The processor may control the display so the display updates in substantially real-time as new data points are generated by changing the physical orientation of the magnetic sensor.

26 Claims, 5 Drawing Sheets

THERMAL IMAGING CAMERA WITH COMPASS CALIBRATION

TECHNICAL FIELD

This disclosure relates to magnetic compasses and, more particularly, to the calibration of magnetic compasses.

BACKGROUND

Thermal imaging cameras are used in a variety of situations. For example, thermal imaging cameras are often used during building inspections to thermally inspect the walls and surfaces of the building. Thermal inspections can detect hot spots, colds spots, or other areas of thermal waste. Thermal inspections can also help detect moisture or overheating machinery or electrical equipment in the building. With knowledge of the thermal profile of a building, an operator can quickly and efficiently take corrective action.

Depending on the configuration of the camera, the thermal imaging camera may include a compass that helps orient the user during operation of the camera. The compass may provide a heading that is displayed by the camera during use. The heading provided by the compass may also be recorded when capturing a thermal image. An operator may use the heading at a later date to capture a thermal image of the same scene from substantially the same orientation. The operator can then compare the subsequently captured thermal image to the original thermal image to monitor thermal changes in the scene over time.

In applications where a thermal imaging camera includes a compass, it may be useful to calibrate the compass occasionally to reduce or eliminate any imprecision or inaccuracies in the heading provided by the compass. Such inaccuracies may be caused by interference sources, such as magnetic interference caused circuitry or hardware, or inaccuracies caused by time, temperature, and the like.

SUMMARY

In general, this disclosure is directed to apparatuses and techniques for calibrating an electronic compass in a thermal imaging camera. In some examples, the thermal imaging camera is rotated in a plurality of physical orientations in three-dimensional space during a calibration routine. While rotating, a processor of the camera may receive measurements from a magnetic sensor mounted in the camera, the measurements being representative of three orthogonal components of a magnetic field when the thermal imaging camera is in a given orientation. After receiving the measurements, the processor may generate a plurality of data points from the plurality of measurements and display a simulated three-dimensional plot of the data points. In some examples, the simulated three-dimensional plot is updated in substantially real-time as new data points are generated as a physical orientation of the thermal imaging camera changes. The simulated three-dimensional plot may be useful to help guide an operator in selecting different physical orientations in which to rotate the camera to collect additional data points.

In one example, a method is described that includes rotating a thermal imaging camera in a plurality of physical orientations in a three-dimensional space. The example method also includes receiving a plurality of measurements from a magnetic sensor mounted in the thermal imaging camera as the thermal imaging camera is rotated in the three-dimensional space, each of the plurality of measurements being representative of three orthogonal components of a magnetic field when the thermal imaging camera is in a given orientation. In addition, the method involves generating a plurality of data points from the plurality of measurements, each of the plurality of data points corresponding to one of the plurality of measurements representative of the three orthogonal components of the magnetic field. According to the example, the method also includes displaying on a display associated with the thermal imaging camera a simulated three-dimensional plot of the data points, where the simulated three-dimensional plot is updated in substantially real-time as new data points are generated as a physical orientation of the thermal imaging camera changes.

In another example, a thermal imaging camera system is described. The thermal imaging camera system includes an infrared camera module configured to capture an infrared (IR) image of a target scene, a magnetic sensor associated with the infrared camera module and configured to sense three orthogonal components of a magnetic field, a display, and a processor. According to the example, the processor is configured to receive a plurality of measurements from the magnetic sensor as a physical orientation of the magnetic sensor is changed in a three-dimensional space, each of the plurality of measurements being representative of the three orthogonal components of the magnetic field when the magnetic sensor is in a given orientation, and generate a plurality of data points from the plurality of measurements, each of the plurality of data points corresponding to one of the plurality of measurements representative of the three orthogonal components of the magnetic field. The processor in this example is also configured to control the display so as to display a simulated three-dimensional plot of the data points that updates in substantially real-time as new data points are generated by changing the physical orientation of the magnetic sensor.

In another example, a non-transitory computer-readable medium is described that includes instructions that cause a programmable processor to receive a plurality of measurements from a magnetic sensor mounted in a thermal imaging camera as a physical orientation of the thermal imaging camera is changed in a three-dimensional space, each of the plurality of measurements being representative of three orthogonal components of a magnetic field when the thermal imaging camera is in a given orientation. According to the example, the medium also includes instructions that cause the programmable processor to generate a plurality of data points from the plurality of measurements, each of the plurality of data points corresponding to one of the plurality of measurements representative of the three orthogonal components of the magnetic field. In addition, in the example, the medium includes instructions that cause the programmable processor to control a display so as to display a simulated three-dimensional plot of the data points that updates in substantially real-time as new data points are generated by changing the physical orientation of the magnetic sensor.

The details of one or more examples are set forth in the accompanying drawings and the description below. Other features, objects, and advantages will be apparent from the description and drawings, and from the claims.

DETAILED DESCRIPTION

Figure 1:
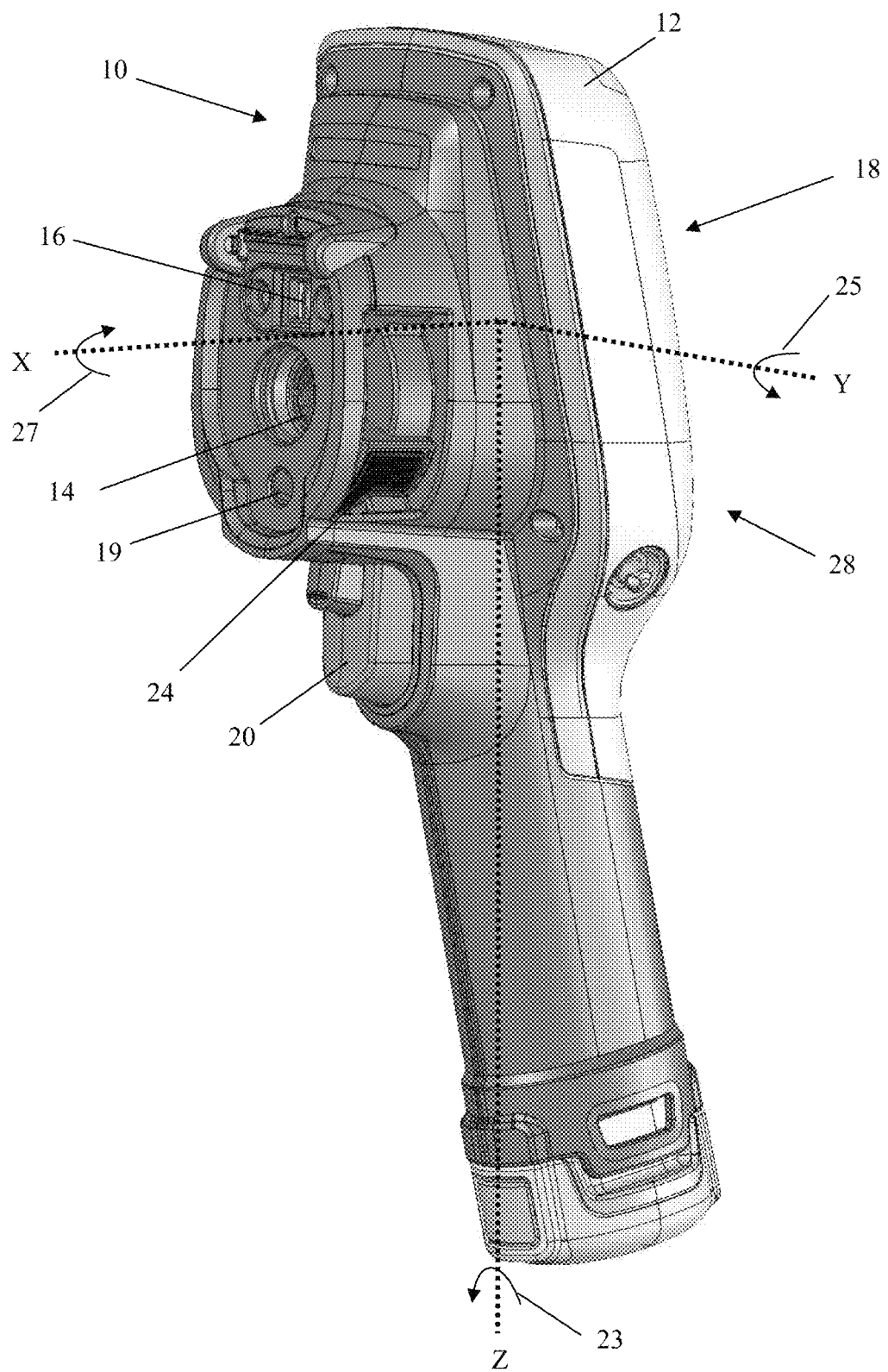
FIG. 1 is a perspective front view of an example thermal imaging camera.

The following detailed description is exemplary in nature and is not intended to limit the scope, applicability, or configuration of the invention. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera can be used to detect heat patterns across a scene under observation. The thermal imaging camera may detect infrared radiation given off by the scene and convert the infrared radiation into an infrared image indicative of the heat patterns. In some examples, the thermal imaging camera includes a compass that provides an indication of the orientation of the camera during operation. The orientation information may be displayed by the camera so that the operator can determine the direction from which the infrared radiation is being emitted. The orientation information may also be stored when the operator captures a thermal image. The operator may use the orientation information associated with different thermal images to identify and interpret the images. For example, when viewing thermal images of different sides of a building, the operator may use the orientation information to identify a particular side of the building captured by a particular thermal image. The orientation information may also be used by the operator to recapture a thermal image of a scene from a given orientation at a later date, allowing the operator to monitor thermal changes in the scene over time.

Ensuring that a compass in a thermal imaging camera is accurately calibrated may help ensure that a user receives accurate orientation information when capturing and viewing thermal images. A well-calibrated compass may lose calibration accuracy after being incorporated into a thermal imaging camera and/or during subsequent operation of the thermal imaging camera. For example, a compass that is initially well-calibrated may lose calibration accuracy after being incorporated into a thermal imaging camera due to hard-iron magnetic field interference. Hard-iron magnetic field interference is normally generated by ferromagnetic materials, such as magnetized iron or steel components that form part of the thermal imaging camera hardware or housing. A compass may also lose calibration during operation, e.g., due to soft-iron magnetic field interferences. Soft-iron magnetic field interferences are typically generated by the items inside the thermal imaging camera during operation. For instance, current carrying traces on a circuit board, a speaker, or magnetically soft materials within the thermal imaging camera may generate a time varying magnetic field during operation that distorts the orientation information generated by the compass.

Because magnetic field interferences can cause a well-calibrated compass within a thermal imaging camera to lose calibration, it may be useful to recalibrate the compass occasionally to help ensure the accuracy of the orientation information generated by the compass. In accordance with some examples described of this disclosure, techniques for calibrating a compass in a thermal imaging camera are described. In some examples, the techniques include rotating a thermal imaging camera in a plurality of physical orientations in a three-dimensional space and receiving a plurality of measurements from a magnetic sensor mounted in the camera. Each of the plurality of measurements may be representative of three orthogonal components of a magnetic field when the thermal imaging camera is in a given orientation. In addition, the techniques may include generating a plurality of data points from the plurality of measurements and displaying a simulated three-dimensional plot of the data points. The simulated three-dimensional plot may update in substantially real-time as new data points are generated as the physical orientation of the thermal imaging camera changes.

The unique weight distributions and shapes of many thermal imaging cameras can make it difficult for a user to collect data points from a statistically appropriate number of different orientations during calibration routine, potentially undermining the accuracy of the calibration. In accordance with the techniques described in some examples in this disclosure, however, a user may view the simulated three-dimensional plot as the plot updates in substantially real-time so as to determine how to vary the physical orientation of the camera to collect measurements associated with physical orientations of the camera not yet observed. In some examples, the simulated three-dimensional plot is configured to move in correspondence with the physical movement of the camera in three-dimensional space, thereby displaying different portions of the plot that correspond to different physical orientations of the thermal imaging camera.

Different example images of simulated three-dimensional plots generated in substantial real-time during a compass calibration routine will be described with respect to FIGS. 4A-4F. However, an example thermal imaging camera system will first be described with respect to FIGS. 1-3.

Figure 2:
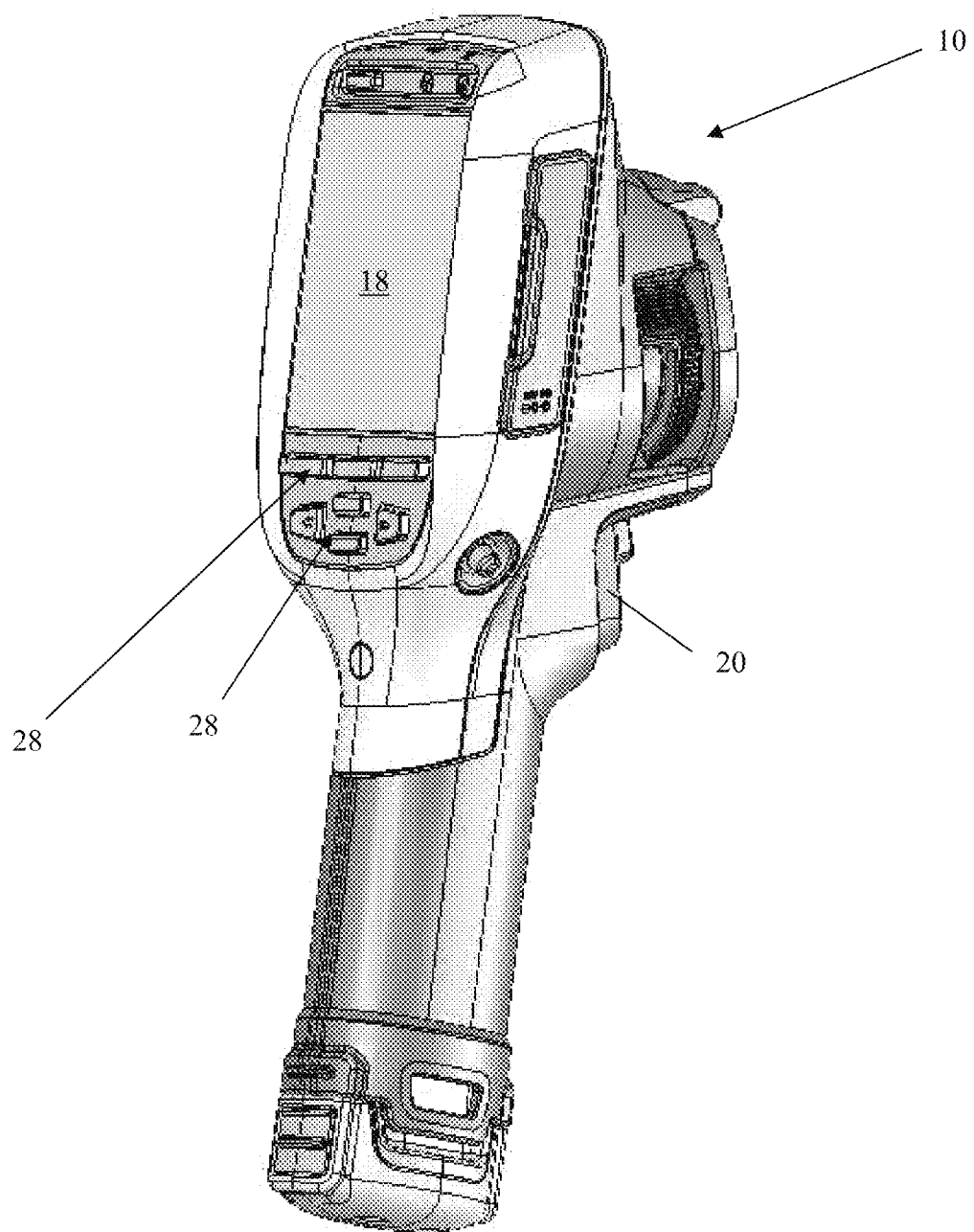
FIG. 2 is a perspective back view of the example thermal imaging camera of FIG. 1.

FIGS. 1 and 2 show front and back perspective views, respectively of an example handheld, portable thermal imaging camera 10, which includes a housing 12, an infrared lens assembly 14, a visible light lens assembly 16, a display 18, a trigger control 20, and a focus ring 24. Housing 12 houses the various components of thermal imaging camera 10. Infrared lens assembly 14 receives infrared radiation from a scene and focuses the radiation on an infrared detector for generating an infrared image of a scene. Visible light lens assembly 16 receives visible light from a scene and focuses the visible light on a visible light detector for generating a visible light image of the same scene. Thermal imaging camera 10 captures the visible light image and/or the infrared image in response to depressing trigger control 20. In addition, thermal imaging camera 10 controls display 18 to display the infrared image and the visible light image generated by the camera, e.g., to help an operator thermally inspect a scene. A user may manipulate rotatable focus ring 24 to adjust the focus of infrared lens assembly 14.

As described in greater detail below, thermal imaging camera 10 may include an electronic compass located within housing 12 that is configured to generate orientation information (e.g., heading information) corresponding to the direction in which the camera is pointed. The electronic compass may include a magnetic sensor that is configured to generate magnetic field signals that vary depending on the orientation of the camera in three-dimensional space. For example, the electronic compass may include a three-axis magnetic sensor that is configured to generate magnetic field signals corresponding to three orthogonal components (e.g., X, Y, and Z components) of a magnetic field. The electronic compass may also include an accelerometer that generates acceleration signals that vary depending on the orientation of the camera in three-dimensional space. For example, the electronic compass may include a three-axis accelerometer that is configured to generate acceleration signals corresponding to three orthogonal directions (e.g., X, Y, and Z components) in a physical space. Thermal imaging camera 10 may process magnetic field strength signals and accelerometer signals generated by the compass to determine an orientation of the thermal imaging camera, e.g., relative to an absolute reference system (e.g., X, Y, Z coordinate system) fixed with respect to ground and an orientation of housing 12 of the camera. Thermal imaging camera 10 may then store the orientation information in memory and/or display the orientation information on display 18.

To define the orientation coordinates of thermal imaging camera 10 in three-dimensional space, three attitude angles may be defined relative to a horizontal plane which is perpendicular to the earth's gravity. In the example of FIG. 1, a heading angle 23, a pitch angle 25, and a roll angle 27 are defined with reference to a local horizontal plane which is perpendicular to the earth's gravity. Heading angle 23, which may also be referred to as an azimuth, is an angle that varies with respect to the magnetic north pole. When rotating thermal imaging camera 10 around the Z-axis, the heading of the camera can be determined relative to magnetic north. Pitch angle 25 is an angle between the X-axis illustrated on FIG. 1 and the horizontal plane. Pitch angle 25 may vary between zero degrees and positive ninety degrees when rotating thermal imaging camera 10 around the Y-axis illustrated on FIG. 1 with the X-axis moving upward. When rotating thermal imaging camera 10 around the Y-axis illustrated on FIG. 1 with the X-axis moving downward, pitch angle 25 may vary from zero degrees to negative ninety degrees. Roll angle 27 is an angle that varies between the Y-axis illustrated on FIG. 1 and the horizontal plane. Roll angle 27 may vary between zero degrees and positive ninety degrees when rotating thermal imaging camera 10 around the X-axis illustrated on FIG. 1 with the Y-axis moving upward and zero degrees and negative ninety degrees when rotating the camera around the X-axis illustrated on FIG. 1 with the Y-axis moving downward.

During use, thermal imaging camera 10 may display on display 18 information representative of the orientation of the camera at any given physical orientation in three-dimensional space. For example, thermal imaging camera 10 may display information representative of heading angle 23, pitch angle 25, and/or roll angle 27 on display 18. Although thermal imaging camera 10 may display any suitable orientation information, a user may find heading information representative of the orientation angle that varies with respect to the magnetic north pole most useful. Accordingly, in one example, thermal imaging camera 10 is configured to display heading information generated via an electronic compass located within housing 12 on display 18. Example heading information that may be displayed by thermal imaging camera 10 includes cardinal ordinate information (e.g., N, NE, E, SE, S, SW, W, NW) corresponding to the direction the camera is pointed, declination angle information (e.g., in degrees) with respect to magnetic north corresponding to the direction the camera is pointed, or the like.

To ensure that the compass within thermal imaging camera 10 provides accurate orientation information over the service life of the camera, the compass may be periodically calibrated. As will be described in greater detail below with respect to FIG. 3, the compass within thermal imaging camera 10 may be calibrated during a calibration routine in which the physical orientation of the camera is changed in three-dimensional space. The electronic compass within the thermal imaging camera (e.g., a magnetic sensor component and/or an accelerometer component within the camera) may generate electrical signals that vary as the physical orientation of the camera is varied in three-dimensional space. Thermal imaging camera 10 may process the electrical signal measurements generated while the camera is in a variety of different orientations and determine appropriate correction factors for calibrating compass measurements generated by the camera.

To collect electrical signal measurements from the electrical compass within thermal imaging camera 10 during a calibration routine, the camera can be physically rotated (e.g., by an operator or machine) in three-dimensional space. Thermal imaging camera 10 can be rotated about the X-axis, Y-axis, and/or Z-axis illustrated on FIG. 1. Rotating thermal imaging camera 10 in a plurality of physical orientations (e.g., at least partially about the X-, Y-, and Z-axes) may provide a more comprehensive data set for calibration than rotating the camera in a lesser number of physical orientations, which may improve the accuracy of the calibration. In some examples, thermal imaging camera 10 is rotated randomly or not in a pre-order series of movements in three-dimensional space to collect measurements for calibration of the electronic compass within the camera. In other examples, thermal imaging camera 10 is rotated in an ordered series of movements (e.g., first around the X-axis illustrated on FIG. 1, then around the Y-axis, and then around the Z-axis) to collect measurements for calibration of the electronic compass within the camera.

In response to the physical rotation of thermal imaging camera 10 in three-dimensional space, the camera may generate a plurality of data points that can be displayed as a plot on display 18. Each data point may correspond to the magnitude of the electrical signal received from the magnetic sensor within the thermal imaging camera when the camera is in a given orientation. For example, when thermal imaging camera 10 includes a three-axis magnetic sensor, the magnetic sensor may generate three electrical signals corresponding to different axes of the magnetic sensor. The magnitude of one electrical signal may correspond to the strength (e.g., magnitude) of the local magnetic field about thermal imaging camera 10 in a first direction (e.g., the X-axis illustrated on FIG. 1), the magnitude of another electrical signal may correspond to the strength of the magnetic field in a second direction (e.g., the Y-axis illustrated on FIG. 1), and the magnitude of the third electrical signal may correspond to the strength of the magnetic field in a third direction (e.g., the Z-axis illustrated on FIG. 1).

Thermal imaging camera 10 may generate a data point in which one coordinate of the data point (e.g., a X-coordinate) is based on the magnitude of the first electrical signal, a second coordinate of the data point (e.g., a Y-coordinate) is based on the magnitude of the second electrical signal, and a third coordinate of the data point (e.g., a Z-coordinate) is based on the magnitude of the third electrical signal, when the three electrical signals are measured at the same time such that thermal imaging camera 10 is in a given orientation. A coordinate of a data point may be based on the magnitude of an electrical signal in that the value for the coordinate be set equal to the value of the electrical signal, the value for the coordinate may be set to a normalized value for the electrical signal, or the magnitude of the electrical signal may otherwise be used to determine the value for the coordinate. Physical rotating thermal imaging camera 10 to a first orientation within three-dimensional space may cause the camera to generate a first data point (e.g., set of coordinates), while subsequently rotating thermal imaging camera 10 to different orientations within the three-dimensional space may cause the camera to generate additional data points (e.g., sets of coordinates).

The accuracy with which the compass within thermal imaging camera 10 is calibrated may depend, e.g., on the number and arrangement of different orientations in which the camera is rotated during a calibration routine. In collecting magnetic sensor measurements, however, it may be difficult for an operator rotating thermal imaging camera 10 to determine which physical direction the camera should be rotated so as to collect sensor measurements corresponding to physical orientations that have not already been tested.

In some examples, thermal imaging camera 10 is configured to display a plot of the data points generated by the camera during a calibration routine on display 18. For example, thermal imaging camera 10 may display a simulated three-dimensional plot of the data points. The simulated three-dimensional plot may update in substantially real-time as new data points are generated by changing the physical orientation of the thermal imaging camera. An operator may view the simulated three-dimensional plot as the plot updates in substantially real-time so as to determine how to vary the physical orientation of the camera to collect measurements associated with physical orientations of the camera not yet observed. In some examples, the simulated three-dimensional plot is configured to move in correspondence with the physical movement of the camera in three-dimensional space, thereby displaying different portions of the plot that correspond to different physical orientations of the thermal imaging camera.

As briefly described above, thermal imaging camera 10 may detect infrared radiation given off by a scene under observation and convert the infrared radiation into an infrared image. In operation, thermal imaging camera 10 detects heat patterns in a scene by receiving energy emitted in the infrared-wavelength spectrum from the scene and processing the infrared energy to generate a thermal image. In some examples, such as the example in FIGS. 1 and 2, thermal imaging camera 10 may also generate a visible light image of the same scene by receiving energy in the visible light-wavelength spectrum and processing the visible light energy to generate a visible light image. In these examples, the infrared image generated by thermal imaging camera 10 is indicative of localized temperatures within the scene at a particular period of time while the visible light image generated by the camera is indicative of the same scene at the same period of time. In other examples, however, thermal imaging camera may not be configured to generate a visible light image.

Thermal imaging camera 10 can be configured to display a thermal image of a scene and/or a visible light image of the same scene. For these and other reasons, thermal imaging camera 10 may include a display. In the example of FIGS. 1 and 2, thermal imaging camera 10 includes display 18, which is located on the back of housing 12 opposite infrared lens assembly 14 and visible light lens assembly 16. Display 18 may be configured to display a visible light image, an infrared image, and/or a blended image that is a simultaneously display of the visible light image and the infrared image. Display 18 may also be configured to display heading or other orientation information generated via the compass within thermal imaging camera 10. In different examples, display 18 may be remote (e.g., separate) from infrared lens assembly 14 and visible light lens assembly 16 of thermal imaging camera 10, or display 18 may be in a different spatial arrangement relative to infrared lens assembly 14 and/or visible light lens assembly 16. Therefore, although display 18 is shown behind infrared lens assembly 14 and visible light lens assembly 16 in FIG. 2, other locations for display 18 are possible.

Thermal imaging camera 10 can include a variety of user input media for controlling the operation of the camera and adjusting different settings of the camera. Example control functions may include adjusting the focus of the infrared and/or visible light optics, opening/closing a shutter, capturing an infrared and/or visible light image, initiating a compass calibration routine, or the like. In the example of FIGS. 1 and 2, thermal imaging camera 10 includes a depressible trigger control 20 for capturing an infrared and visible light image, and buttons 28 for controlling other aspects of the operation of the camera. A different number or arrangement of user input media are possible, and it should be appreciated that the disclosure is not limited in this respect. For example, thermal imaging camera 10 may include a touch screen display 18 which receives user input by depressing different portions of the screen.

Figure 3:
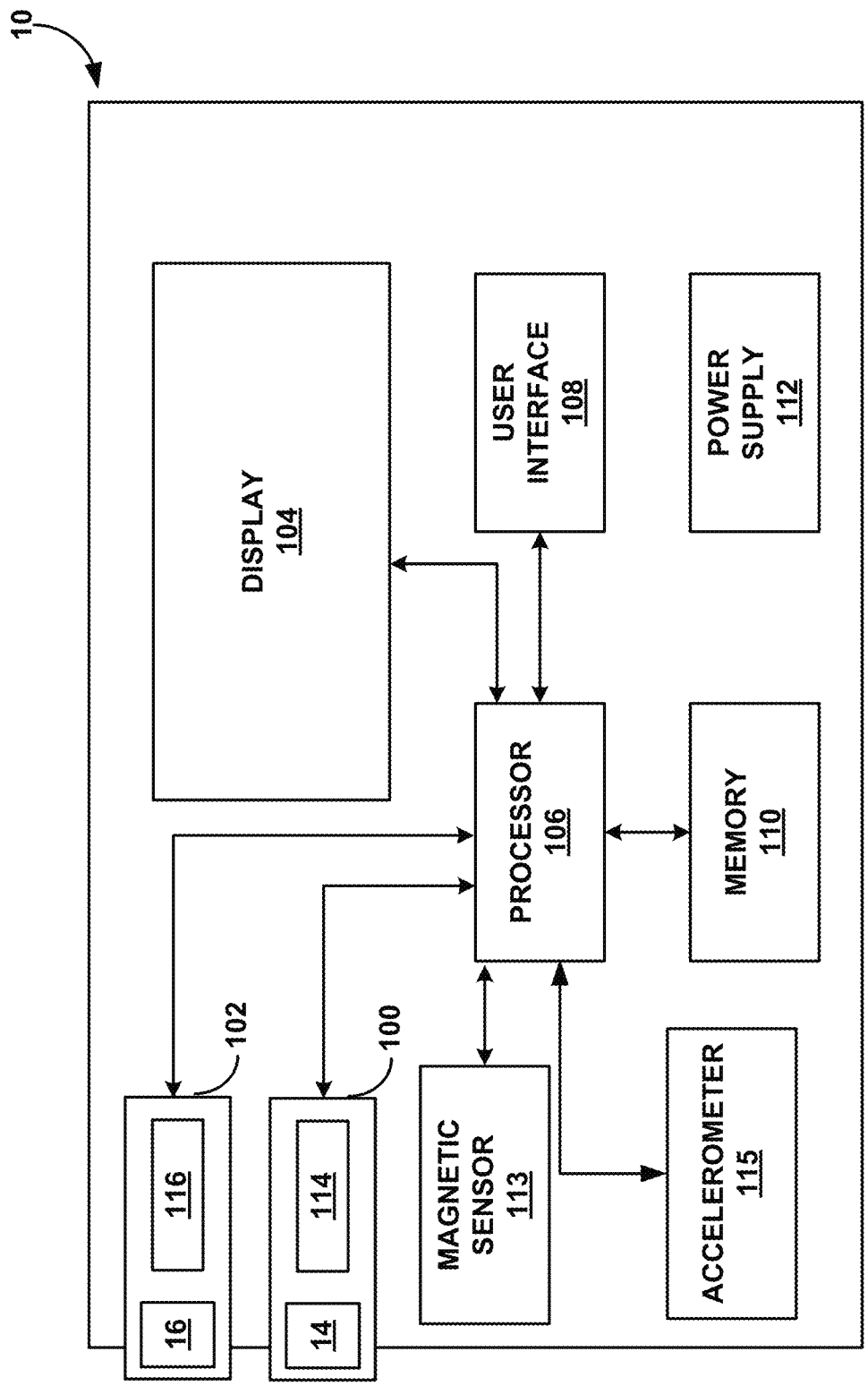
FIG. 3 is a functional block diagram illustrating example components of the thermal imaging camera of FIGS. 1 and 2.

FIG. 3 is a functional block diagram illustrating components of an example of thermal imaging camera 10, which includes an infrared camera module 100, a visible light camera module 102, a display 104, a processor 106, a user interface 108, a memory 110, and a power supply 112. Thermal imaging camera 10 also includes a magnetic sensor 113 and an accelerometer 115. Processor is communicatively coupled to infrared camera module 100, visible light camera module 102, display 104, user interface 108, memory 110, magnetic sensor 113, and accelerometer 115. Power supply 112 delivers operating power to the various components of thermal imaging camera 10 and, in some examples, may include a rechargeable or non-rechargeable battery and a power generation circuit.

During operation of thermal imaging camera 10, processor 106 controls infrared camera module 100 and visible light camera module 102 with the aid of instructions associated with program information that is stored in memory 110 to generate a visible light image and an infrared image of a target scene. Processor 106 further controls display 104 to display the visible light image and/or the infrared image generated by thermal imaging camera 10. In some additional examples, processor 106 determines an orientation of thermal imaging camera 10 (e.g., a heading of the camera) with the aid of instructions stored in memory 110 based on measurements received from magnetic sensor 113 and accelerometer 115. Processor 106 can control display 104 to display the determined orientation of the camera during operation. Processor 106 can also store the determined orientation in memory 110. For example, upon depressing trigger control 20 (FIG. 1), processor 106 may capture a visible light image and/or an infrared image of a scene under observation and store the image(s) in memory 110. Processor 106 may also store a determined orientation of the camera at the time the image(s) were captured in memory 110.

Magnetic sensor 113 is configured to measure the strength of a magnetic field in the vicinity of the sensor. Magnetic sensor 113 may include multiple axes, where each axis of the magnetic sensor is configured to measure a different orthogonal component of the magnetic field in the vicinity of the sensor. For example, magnetic sensor 113 may be a three-axis magnetic sensor (e.g., a three-axis magnetometer) that is configured to measure three orthogonal components (e.g., X-, Y-, and Z-components) of a magnetic field in the vicinity of the magnetic sensor. The magnetic field in the vicinity of the sensor may be a combination of the earth's magnetic field and spurious magnetic fields, e.g., generated by hard-iron magnetic field interferences and/or soft-iron magnetic field interferences.

During use, processor 106 can receive an electrical signal from magnetic sensor 113 representative of the magnetic field strength measured by the magnetic sensor at any give time. For example, in instances in which magnetic sensor 113 is a three-axis magnetic sensor, processor 106 may receive three different electrical signals from magnetic sensor, where each electrical signal corresponds to the strength of a different orthogonal component of the magnetic field in the vicinity of the sensor. Processor 106 may receive a first measurement associated with a first axis of the three-axis magnetic sensor, a second measurement associated with a second axis of the three-axis magnetic sensor, and a third measurement associated with a third axis of the three-axis magnetic sensor. The three measurements may be captured or generated at substantially the same time (e.g., when thermal imaging camera is in a given physical orientation), or the three measurements may be captured or generated at different times. In either example, the magnitude of the electrical signals received from magnetic sensor 113 may vary as the physical orientation of thermal imaging camera 10 in changed in three-dimensional space.

In the example of FIG. 3, thermal imaging camera 10 also includes accelerometer 115. Accelerometer 115 is configured to generate acceleration signals that indicate the acceleration forces to which thermal imaging camera 10 is subject. As with magnetic sensor 113, accelerometer 115 may include multiple axes that measure different orthogonal components of an acceleration force that is applied to thermal imaging camera 10. For example, accelerometer 115 may be a three-axis accelerometer where each axis of the accelerometer is configured to generate an acceleration signal corresponding to a different orthogonal direction (e.g., X, Y, and Z components) in a physical space.

Processor 106 can receive an electrical signal from accelerometer 115 representative of the magnitude of the acceleration forces measured by the sensor at any give time. For example, in instances in which accelerometer 115 is a three-axis accelerometer, processor 106 may receive three different electrical signals from the sensor, where each electrical signal corresponds to the strength of acceleration force in a different orthogonal direction in three-dimensional space. Processor 106 may receive a first measurement associated with a first axis of the three-axis accelerometer, a second measurement associated with a second axis of the three-axis accelerometer, and a third measurement associated with a third axis of the three-axis accelerometer. The three measurements may be captured or generated at substantially the same time (e.g., when thermal imaging camera is in a given physical orientation), or the three measurements may be captured or generated at different times. Further, the measurements from accelerometer 115 may be captured at substantially the same time corresponding measurements from magnetic sensor 113 are captured or different times.

Magnetic sensor 113 and accelerometer 115 may comprise at least part of the hardware within thermal imaging camera 10 that defines an electronic compass. While magnetic sensor 113 and accelerometer 115 are illustrated as being separate components in the example of FIG. 3, in other examples, the magnetic sensor and accelerometer may be defined by a single component such as, e.g., a MEMS (micro-electro-mechanical-system) package. Further, in still other examples, thermal imaging camera 10 may not include accelerometer 115.

When thermal imaging camera 10 is configured with magnetic sensor 113 and accelerometer 115, processor 106 can determine a physical orientation of the camera in three-dimensional space. Thermal imaging camera 10 may process magnetic field strength signals and/or accelerometer signals generated by the compass to determine an orientation of the thermal imaging camera, e.g., relative to an absolute reference system (e.g., X, Y, Z coordinate system) fixed with respect to ground and an orientation of housing 12 of the camera. Thermal imaging camera 10 may then store the orientation information in memory and/or display the orientation information on display 18. For example, processor 106 can determine pitch angle 25 (FIG. 1) and roll angle 27 as follows:

$$\text{Pitch Angle} = \alpha = \arctan\left(\frac{A_x}{\sqrt{(A_y)^2 + (A_z)^2}}\right) \qquad \text{Equation (1)}$$

$$\text{Roll Angle} = \beta = \arctan\left(\frac{A_y}{A_z}\right) \qquad \text{Equation (2)}$$

In Equations (1) and (2), $A_x$ is the measurement received from the X-axis of a three-axis accelerometer, while $A_y$ and $A_z$ are the measurements received from the Y- and Z-axes of the three-axis accelerometer, respectively. The X-, Y-, and Z-axes of the three axis accelerometer may correspond to (e.g., be the same as) the X-, Y-, and Z-orientation axes illustrated on FIG. 1, or the axes of the accelerometer may be different than the physical orientation axes of thermal imaging camera 10.

In addition to or in lieu of determining pitch angle 25 and roll angle 27, in some examples, processor 106 determines heading angle 23 (FIG. 1) of thermal imaging camera 10. For the heading calculation, three axis magnetic sensor measurements may be reflected onto a two-dimensional horizontal plane by tilt compensation. In accordance with these examples, the heading angle may be determined as follows:

$$H_{xe} = H_x * \cos(\alpha) - H_y * \sin(\alpha) * \sin(\beta) - H_z * \sin(\alpha) * \cos(\beta) \qquad \text{Equation (3)}$$

$$H_{ye} = H_y * \cos(\alpha) + H_z * \sin(\beta) \qquad \text{Equation (4)}$$

$$\text{Heading Angle} = \arctan(H_{ye}/H_{xe}) \qquad \text{Equation (5)}$$

In Equations (3)-(5), $H_{xe}$ and $H_{ye}$ are the measured magnetic field strengths along the X- and Y-axes after compensating for tilt by reflecting a three-dimensional magnetic field onto a two-dimensional horizontal plane. $H_x$ is the measurement received from the X-axis of the three-axis magnetic sensor, while $H_y$ and $H_z$ are the measurements received from the Y- and Z-axes of the three-axis magnetic sensor, respectively. The X-, Y-, and Z-axes of the three axis magnetic sensor may correspond to (e.g., be the same as) the X-, Y-, and Z-orientation axes illustrated on FIG. 1, or the axes of the magnetic sensor may be different than the physical orientation axes of thermal imaging camera 10. In addition, in Equations (3)-(5), α is the pitch angle determined according to Equation (1) and β is the roll angle determined according to Equation (2). Processor 106 can store heading, pitch, and/or roll angles determined according to Equations (1)-(5) in memory 110 and/or display one or more of the angles on display 104.

The two-dimensional magnetic field strength values calculated according to Equations (3) and (4) above, and the corresponding Heading Angle calculated according to Equation (5) above, may be accurate for an ideal magnetic sensor that is not influenced by magnetic field interferences or sensitivity differences between measurements of different orthogonal components of the magnetic field in the vicinity of the sensor. In practice, however, magnetic field interferences and sensitivity differences may cause inaccuracies in the Heading Angle determined directly from Equations (3)-(5). To account for these inaccuracies, uncalibrated magnetic field strength measurements received from magnetic sensor 113 can be adjusted as follows:

$$H_{xc} = (H_x - \text{Offset}_x)/\text{gain}_x \quad \text{Equation (6)}$$

$$H_{yc} = (H_y - \text{Offset}_y)/\text{gain}_y \quad \text{Equation (7)}$$

$$H_{zc} = (H_z - \text{Offset}_z)/\text{gain}_z \quad \text{Equation (8)}$$

In Equations (6)-(8), uncalibrated magnetic field strength measurements corresponding to the X-, Y-, and Z-axes of the three-axis magnetic sensor are represented as $H_x$, $H_y$, and $H_z$, respectively. Calibrated magnetic field measurements corresponding to the three axes of the magnetic sensor are represented as $H_{xc}$, $H_{yc}$, and $H_{zc}$, respectively. The Offset parameters are values that compensate for magnetic field interferences such as soft-iron magnetic field interferences and hard-iron magnetic field interferences. Further, the gain parameters are values that account for measurement sensitivity differences between the different orthogonal components of the three-axis magnetic sensor.

Offset parameters and gain parameters used in Equations (6)-(8) can be stored in memory 110 as calibration parameters that are referenced by processor 106 to determine calibrated magnetic field strength measurements. The calibrated magnetic field strength measurements can then be used in Equations (3)-(5) in lieu of uncalibrated magnetic field strength measurement values to determine a calibrated Heading Angle.

Periodically, magnetic sensor 113 and/or accelerometer 115 may be recalibrated to help ensure the accuracy of orientation measurements determined by processor 106. For example, the Offset parameters in Equations (6)-(8) may need to be re-determined periodically to compensate for changes caused by magnetization or demagnetization of material within thermal imaging camera 10. Such changes in magnetization may occur when thermal imaging camera 10 is exposed to an external magnetic field as may occur, for example, when the camera is taken through airport security, brought in close proximity to a motor that produces an external magnetic field, or the like.

Magnetic sensor 113 may be recalibrated (e.g., by determining new Offset and/or gain parameters) using the techniques of the present disclosure. Magnetic sensor 113 may be recalibrated, e.g., during a calibration routine that is initiated upon receiving a user input via buttons 28 (FIG. 2). Magnetic sensor 113 can be calibrated shortly after the sensor is installed within housing 12 of thermal imaging camera 10, e.g., to compensate for magnetic field interferences attributable to the hardware and components thermal imaging camera 10. Magnetic sensor 113 can also be calibrated periodically during the service life of thermal imaging camera 10, e.g., to account for changes in calibration due to time, temperature, wear, changes due to the magnetization or demagnetization of material within thermal imaging camera 10, or the like.

During a calibration routine, processor 106 can acquire data representative of the magnetic field strength around the sensor when thermal imaging camera 10 is in a variety of different physical orientations. Processor 106 can further determine scale factors for correcting the signals received from the sensor, which can be applied during subsequent operation to produce a calibrated output. For example, processor 106 can receive electrical signals from magnetic sensor 113 as thermal imaging camera 10 is physically rotated in three-dimensional space. Processor 106 can store data representative of the received signals from magnetic sensor 113 and/or display data representative of the received signals on display 18.

In one example, magnetic sensor 113 comprises (e.g., is) a three-axis magnetic sensor. In this example, processor 106 may receive three different electrical signals from magnetic sensor as the thermal imaging camera is rotated. Processor 106 can receive a first measurement associated with a first axis of the three-axis magnetic sensor, a second measurement associated with a second axis of the three-axis magnetic sensor, and a third measurement associated with a third axis of the three-axis magnetic sensor. The three measurements may represent three different orthogonal components of the magnetic field strength around the sensor. Further, the magnitude of each signal associated with each axis of the three-axis magnetic sensor may vary as the thermal imaging camera is rotated.

Upon receiving the data representative of the magnetic field strength around magnetic sensor 113 from the sensor, processor 106 can generate a plurality of data points corresponding to the received data. Each data point of the plurality of data points may include a first coordinate based on the magnitude of the magnetic field in a first direction (e.g., the X-direction indicated on FIG. 1), a second coordinate based on the magnitude of the magnetic field in a second direction orthogonal to the first direction (e.g., the Y-direction indicated on FIG. 1), and a third coordinate based on the magnetic field in a third direction orthogonal to the second direction (e.g., the Z-direction indicated on FIG. 1). When using a Cartesian coordinate system in accordance with this example, each data point may be represented by a set (e.g., X, Y, Z) of coordinates. Each coordinate of the set of coordinates may be based on the magnitude of the magnetic field in a given direction in that the magnitude of the electrical signal received from the axis of the magnetic sensor corresponding to that direction may be used to determine the value for the coordinate. For example, the coordinate may be a normalized or adjusted value of the magnitude of the electrical signal received by processor 106.

To generate a data point corresponding to the magnetic field strength around magnetic sensor 113 when thermal imaging camera is in a given orientation, processor 106 may associate a first measurement received from the first axis of the magnetic sensor with a second measurement received from the second axis of the magnetic sensor and a third measurement received from the third axis of the magnetic sensor. In one example, the first, second, and third measurements are each captured at the same time (e.g., same instant) when thermal imaging camera 10 is in a given physical orientation. In another example, the first, second, and third measurements are each be captured over the same time interval. In such an example, processor 106 may select a particular magnetic field strength measurement for each axis over the time interval (e.g., the smallest, largest, medium, and/or mode value) or determine a composite value (e.g., a mean value over the time interval) for subsequently determining each the coordinate.

Independent of the specific technique used to generate each data point, processor 106 can generate a plurality of data points. Each data point can comprise a set of three coordinates, where each coordinate of the set of three coordinates corresponds to one of the orthogonal components of the magnetic field measurement associated with such data point. As each data point of the plurality of data points may correspond to the magnetic field strength sensed by magnetic sensor 113 when thermal imaging camera 10 is in a given orientation, rotating the camera from one physical orientation to another physical orientation may generate additional data points.

As previously indicated, in some examples, processor 106 can control display 104 during calibration to display a plot of the generated data points that correspond to the magnetic field strength around magnetic sensor 113. In no interfering magnetic fields are sensed by magnetic sensor 113, the sensor may only sense the earth's magnetic field. In such an example, a plot of the data points generated by processor 106 may produce a sphere centered on the origin of the coordinate system used to plot the data points. In practice, however, distortions caused, e.g., by magnetic field interference sources, can cause the sphere to be shifted from the origin of the coordinate system and/or distorted into an ellipsoid or other substantially spherically shaped object. Correcting such shifts and shape distortions by determining scale factors to apply to the measurement signals received from magnetic sensor 113 may calibrate the magnetic sensor for subsequent use in thermal imaging operations.

The accuracy with which magnetic sensor 113 within thermal imaging camera 10 can be calibrated may depend, e.g., on the accuracy with which the shape and shift of the magnetic field sensed by the sensor before calibration can be determined. In general, increasing the number of different physical orientations in which thermal imaging camera 10 is rotated during calibration may increase the accuracy of the subsequent calibration of the sensor.

In some examples, processor 106 can control display 104 (e.g., during a calibration routine) to display a plot of the magnetic field strength data points generated by the processor. For example, processor 106 can control display 104 to display a simulated three-dimensional plot of the data points representative of magnetic field strength sensed by magnetic sensor 113 as thermal imaging camera 10 is rotated in three-dimensional space. Processor 106 may update the plot in substantially real-time as the processor generates new data points corresponding to changes in the physical orientation of thermal imaging camera 10 in three-dimensional space. For example, processor 106 may control display 104 to add new data points to the plot as the data points are generated by the processor. The plot may be a simulated three-dimensional plot in that the plot illustrates a three-dimensional structure on a two-dimensional display.

Displaying a plot of the magnetic field strength data sensed by magnetic sensor 113 while rotating thermal imaging camera 10 may be useful to help guide an operator in selecting different physical orientations in which to rotate the camera. The plot may be used to identify data not yet collected during the calibration procedure, which may indicate how the operator should vary the physical orientation of the camera to collect the data.

In one example, processor 106 is configured to control display 104 so that the simulated three-dimensional plot is configured to rotate while the physical orientation of the thermal imaging camera is changed such that different portions of the plot are displayed corresponding to different physical orientations of the thermal imaging camera. For example, physically rotating thermal imaging camera 10 a certain number of degrees (e.g., 30 degrees) in one direction may cause the simulated three-dimensional plot displayed on display 104 to rotate a corresponding number of degrees (e.g., 30 degrees). In another example, processor 106 is configured to control display 104 so that the simulated three-dimensional plot is configured to rotate while the physical orientation of the thermal imaging camera remains stationary. In still other examples, the simulated three-dimensional plot may not rotate on display 104.

Figure 4C:
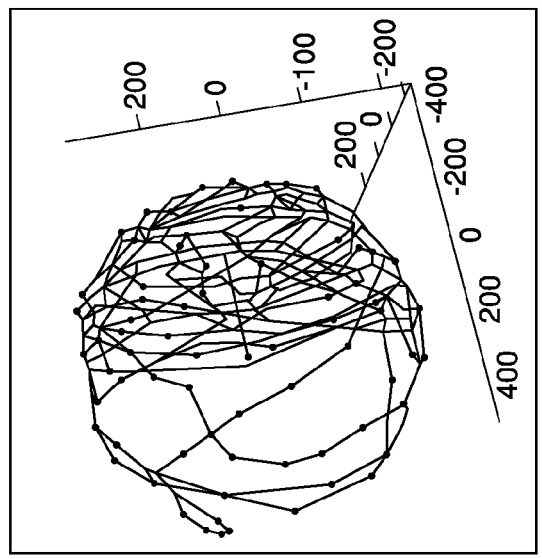
FIGS. 4A-4F are example images of simulated three-dimensional plots generated in substantial real-time during a compass calibration routine.
Figure 4B:
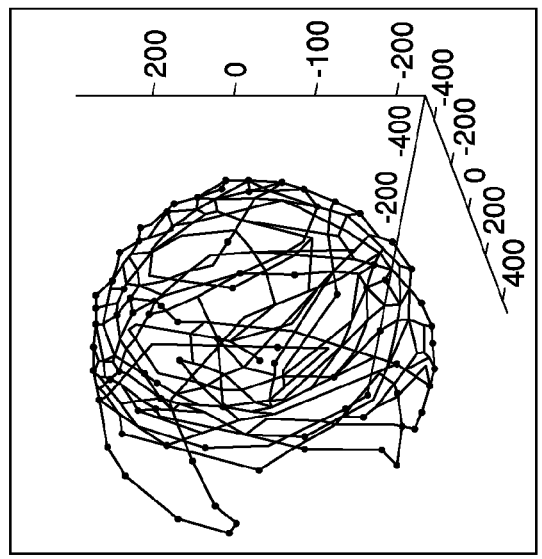
Figure 4A:
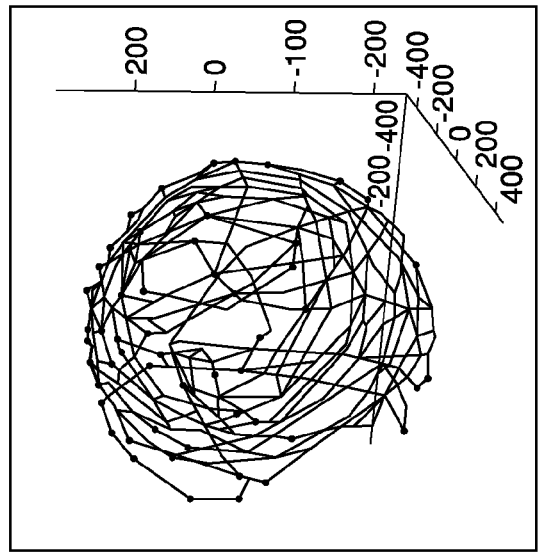
Figure 4F:
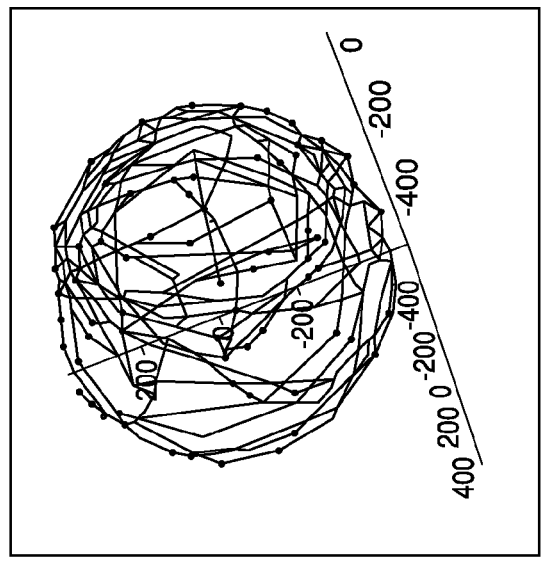
Figure 4E:
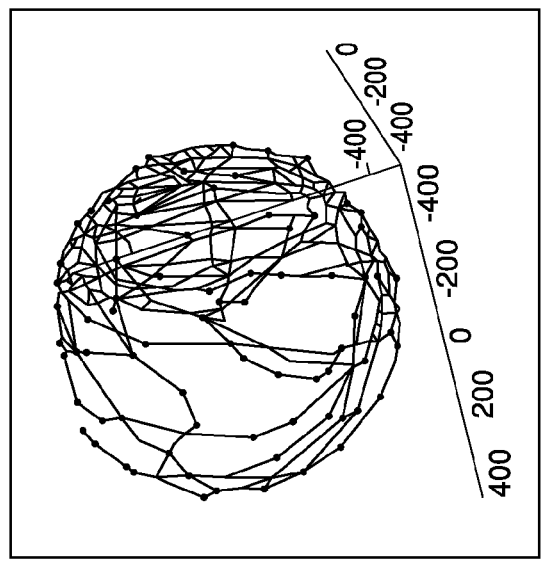
Figure 4D:
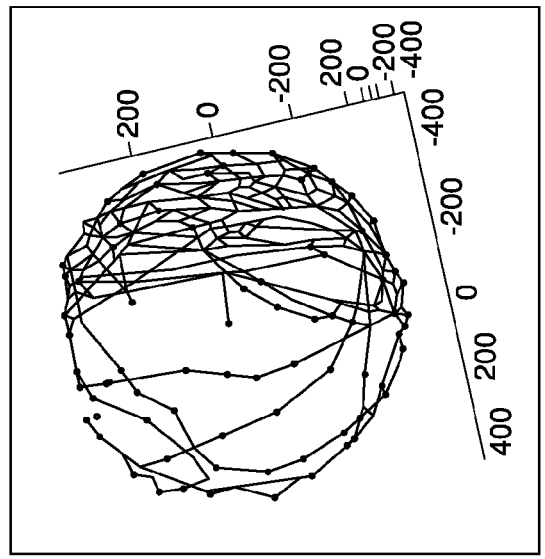

FIGS. 4A-4F are example images of simulated three-dimensional plots that may be generated by thermal imaging camera 10 and displayed on display 104 during calibration of magnetic sensor 113. FIG. 4A shows a simulated three-dimensional plot of data points generated by processor 106 corresponding to magnetic field strength data sensed by magnetic sensor 113. FIGS. 4B-4F are subsequent images of the simulated three-dimensional plot of FIG. 4A as the plot is updated in substantially real-time with additional data points, e.g., as the data points are generated during physical rotation of the thermal imaging camera. In addition, FIGS. 4B-4F show different example rotational orientations of the simulated three-dimensional plot of FIG. 4A as the plot is rotated on display 104. Although the example plots of FIGS. 4A-4F show data points plotted as round dots connected by lines, in other examples, the data points may have different sizes, shapes, or configurations, and the data points may or may not be connected. It should be appreciated that the disclosure is not limited to the configuration of example plots shown in FIGS. 4A-4F.

In practice, an operator can rotate thermal imaging camera 10 until a suitable number of data points are collected and/or a suitable distribution of data points (e.g., across the surface of the simulated three-dimensional sphere displayed on display 104) is collected. As indicated above, an operator may view the simulated three-dimensional plot displayed on display 104 during a calibration routine to identify how the physical orientation of the camera should be changed to add data points to portions of the plot not already populated with data points. In some examples, the axes of the simulated three-dimensional plot displayed on display 104 correspond to the axes of thermal imaging camera 10 (e.g., the X-, Y-, and Z-axes indicated on FIG. 1) such that physically rotating the camera in one direction (e.g., about the X-axis) adds data points to the simulated three-dimensional plot about the same axis. In other examples, the axes of the simulated three-dimensional plot displayed on display 104 may not correspond to the axes of thermal imaging camera 10.

In some examples, processor 106 may determine how thermal imaging camera 10 should be physically rotated to add data points to portions of the plot not already populated with data points and indicate to the operator how the operator should vary the physical orientation of the camera to collect such data points. Depending on the configuration of thermal imaging camera 10, the camera may provide audio, textual, graphical, tactile indications or combinations of indications to instruct the operator how to vary the physical orientation of the camera to collect the data points. In one example, processor 106 is configured to control display 104 to display instructions indicating to the operator how the operator should vary the physical orientation of the camera to collect such data points. Upon reference to memory 110, processor 106 may determine when a suitable number of data points have been collected. Thermal imaging camera 10 may indicate to the operator when a sufficient number of data points have been collected so that the operator can stop changing orientation of the camera in the three-dimensional space.

Upon collecting a suitable number of data points corresponding to the magnetic field strength sensed by magnetic sensor 113. Processor 106 can calibrate the magnetic sensor, e.g., by determining scale factors and/or offset factor to apply to the measurement signals received from magnetic sensor 113. Processor 106 can store the calibration factors in memory 110. During subsequent operation of thermal imaging camera 10 (e.g., outside of a calibration routine), processor 106 may reference the determine calibration factors stored in memory 110 to generated a calibrated magnetic sensor output.

In the example of FIG. 3, thermal imaging camera 10 also includes infrared camera module 100 and visible light camera module 102. Infrared camera module 100 may be configured to receive infrared energy emitted by a target scene and to focus the infrared energy on an infrared detector for generation of infrared energy data, e.g., that can be displayed in the form of an infrared image on display 104 and/or stored in memory 110. Infrared camera module 100 includes infrared lens assembly 14 and infrared detector 114. Infrared lens assembly 14 includes at least one lens that takes infrared energy emitted by a target scene and focuses the infrared energy on infrared detector 114. Infrared detector 114 responds to the focused infrared energy by generating an electrical signal that can be converted and displayed as an infrared image on display 104.

Infrared detector 114 may include one or more focal plane arrays (FPA) that generate electrical signals in response to infrared energy received through infrared lens assembly 14. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by processor 106 and processed into an infrared image displayed on display 104.

During operation of thermal imaging camera 10, processor 106 can control infrared camera module 100 to generate infrared image data for creating an infrared image. Processor 106 can generate a "frame" of infrared image data by measuring an electrical signal from each infrared sensor element included in the FPA of infrared detector 114. The magnitude of the electrical signal (e.g., voltage, current) from each infrared sensor element may correspond to the amount of infrared radiation received by each infrared sensor element, where sensor elements receiving different amounts of infrared radiation exhibit electrical signal with different magnitudes. By generating a frame of infrared image data, processor 106 captures an infrared image of a target scene at a given point in time.

Processor 106 can capture a single infrared image or "snap shot" of a target scene by measuring the electrical signal of each infrared sensor element included in the FPA of infrared detector 114 a single time. Alternatively, processor 106 can capture a plurality of infrared images of a target scene by repeatedly measuring the electrical signal of each infrared sensor element included in the FPA of infrared detector 114. In examples in which processor 106 repeatedly measures the electrical signal of each infrared sensor element included in the FPA of infrared detector 114, processor 106 may generate a dynamic thermal image (e.g., a video representation) of a target scene. For example, processor 106 may measure the electrical signal of each infrared sensor element included in the FPA at a rate sufficient to generate a video representation of thermal image data such as, e.g., 30 Hz or 60 Hz. Processor 106 may perform other operations in capturing an infrared image such as sequentially actuating a shutter (not illustrated) to open and close an aperture of infrared lens assembly 14, or the like.

As briefly noted above, thermal imaging camera 10 includes visible light camera module 102. Visible light camera module 102 may be configured to receive visible light energy from a target scene and to focus the visible light energy on a visible light detector for generation of visible light energy data, e.g., that can be displayed in the form of a visible light image on display 104 and/or stored in memory 110. In the example of FIG. 3, visible light camera module 102 is illustrated as including visible light lens assembly 16 and a visible light detector 116. Visible light lens assembly 16 includes at least one lens that received visible light from a target scene and focuses the visible light on visible light detector 116. Visible light detector 116 responds to the focused energy by generating an electrical signal that can be converted and displayed as a visible light image on display 104. Visible light detector 116 may include a plurality of sensor elements such as, e.g., CMOS detectors, CCD detectors, PIN diodes, avalanche photo diodes, or the like.

During operation of thermal imaging camera 10, processor 106 can control visible light camera module 102 to generate visible light data from a captured target scene for creating a visible light image. Processor 106 can generate a "frame" of visible light image data by measuring the response of each visible light sensor element of thermal imaging camera 10 a single time. By generating a frame of visible light data, processor 106 captures visible light image of a target scene at a given point in time. Processor 106 may also repeatedly measure the response of each visible light sensor element of thermal imaging camera 10 so as to generate a dynamic thermal image (e.g., a video representation) of a target scene, as described above with respect to infrared camera module 100.

Processor 106 may control display 104 to concurrently display at least a portion of the visible light image captured by thermal imaging camera 10 and at least a portion of the infrared image captured by thermal imaging camera 10. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 106 may control display 104 to display the visible light image and the infrared image in side-by-side arrangement, in a picture-in-picture arrangement, where one of the images surrounds the other of the images, or any other suitable arrangement where the visible light and the infrared image are concurrently displayed.

The configuration of thermal imaging camera 10 illustrated in FIGS. 1-3 is merely one example. In other examples, thermal imaging camera 10 may include a different type or different configuration of hardware. Further, thermal imaging camera 10 need not include a visible light camera and associated hardware and software.

Components described as processors within thermal imaging camera 10, including processor 106, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination.

In general, memory 110 stores program instructions and related data that, when executed by processor 106, cause thermal imaging camera 10 and processor 106 to perform the functions attributed to them in this disclosure. Memory 110 may include any fixed or removable magnetic, optical, or electrical media, such as RAM, ROM, CD-ROM, hard or floppy magnetic disks, EEPROM, or the like. Memory 110 may also include a removable memory portion that may be used to provide memory updates or increases in memory capacities. A removable memory may also allow image data to be easily transferred to another computing device, or to be removed before thermal imaging camera 10 is used in another application. Data exchange between memory 110 and an external device may occur via an SD card, a USB port, or other wired or wireless connection. When implemented in software, the functionality ascribed to thermal imaging camera 10 in this disclosure may be embodied as instructions on a computer-readable medium. The computer-readable medium may be non-transitory.

An operator may interact with thermal imaging camera 10 via user interface 108, which may include buttons, keys, or another mechanism for receiving input from a user. The operator may receive output from thermal imaging camera 10 via display 104. Display 104 may be configured to display an infrared-image and/or a visible light image and/or a simulated three-dimensional image in any acceptable palette, or color scheme, and the palette may vary, e.g., in response to user control. In some examples, display 104 is configured to display an infrared image in a monochromatic palette such as grayscale or amber. In other examples, display 104 is configured to display an infrared image in a color palette such as, e.g., ironbow, blue-red, or other high contrast color scheme. Combination of grayscale and color palette displays are also contemplated.

The techniques described in this disclosure, including those attributed to thermal imaging camera 10 or various constituent components, may be implemented, at least in part, in hardware, software, firmware or any combination thereof. For example, various aspects of the techniques may be implemented within one or more processors or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Various examples have been described. These and other examples are within the scope of the following claims.

The invention claimed is:

1. A method comprising:
rotating a thermal imaging camera in a plurality of physical orientations in a three-dimensional space during a calibration routine;
receiving a plurality of measurements from a magnetic sensor mounted in the thermal imaging camera as the thermal imaging camera is rotated in the three-dimensional space during the calibration routine, each of the plurality of measurements being representative of three orthogonal components of a magnetic field when the thermal imaging camera is in a given orientation;
generating a plurality of data points from the plurality of measurements, each of the plurality of data points corresponding to one of the plurality of measurements representative of the three orthogonal components of the magnetic field; and
displaying on a display associated with the thermal imaging camera a simulated three-dimensional plot of the data points,
wherein the simulated three-dimensional plot is updated in substantially real-time during the calibration routine as new data points are generated as a physical orientation of the thermal imaging camera changes.

2. The method of claim 1, wherein each data point of the plurality of data points comprises three coordinates, each coordinate corresponding to one of the orthogonal components of the magnetic field measurement associated with the data point.

3. The method of claim 1, wherein the simulated three-dimensional plot is substantially spherical-shaped, and the three-dimensional plot is configured to rotate while being displayed so as to display data points on different portions of the substantially spherical-shaped plot.

4. The method of claim 3, wherein the three-dimensional plot is configured to rotate while the physical orientation of the thermal imaging camera is changed such that different portions of the substantially spherical-shaped plot are displayed corresponding to different physical orientations of the thermal imaging camera.

5. The method of claim 3, wherein the three-dimensional plot is configured to rotate while the physical orientation of the thermal imaging camera remains stationary.

6. The method of claim 1, wherein the magnetic sensor comprises a three-axis magnetometer.

7. The method of claim 6, wherein receiving a plurality of measurements comprises, for each of the plurality of data points, receiving a first measurement associated with a first axis of the three-axis magnetometer, receiving a second measurement associated with a second axis of the three-axis magnetometer, and receiving a third measurement associated with a third axis of the three-axis magnetometer.

8. The method of claim 7, wherein generating a plurality of data points from the plurality of measurements comprises, for each of the plurality of data points, associating the first measurement with the second measurement and the third measurement, the first, second, and third measurements each being captured at a same given time.

9. The method of claim 1, wherein each data point of the plurality of data points comprises a first coordinate based on a magnitude of the magnetic field in a first direction, a second coordinate based on the magnitude of the magnetic field in a second direction orthogonal to the first direction, and a third coordinate based on the magnetic field in a third direction orthogonal to the second direction.

10. The method of claim 1, further comprising instructing a user how to change the physical orientation of the thermal imaging camera so as to add data points to a portion of the simulated three-dimensional plot that is not populated with data points.

11. The method of claim 1, further comprising indicating to a user that a sufficient number of data points have been collected such that the physical orientation of the thermal imaging camera can stop changing in the three-dimensional space.

12. A thermal imaging camera system comprising:
an infrared camera module configured to capture an infrared (IR) image of a target scene;
a magnetic sensor associated with the infrared camera module and configured to sense three orthogonal components of a magnetic field;
a display; and a processor configured to receive a plurality of measurements from the magnetic sensor as a physical orientation of the magnetic sensor is changed in a three-dimensional space during a calibration routine, each of the plurality of measurements being representative of the three orthogonal components of the magnetic field when the magnetic sensor is in a given orientation, generate a plurality of data points from the plurality of measurements during the calibration routine, each of the plurality of data points corresponding to one of the plurality of measurements representative of the three orthogonal components of the magnetic field, and control the display so as to display a simulated three-dimensional plot of the data points that updates in substantially real-time during the calibration routine as new data points are generated by changing the physical orientation of the magnetic sensor.

13. The thermal imaging camera system of claim 12, wherein each data point of the plurality of data points comprises three coordinates, each coordinate corresponding to one of the orthogonal components of the magnetic field measurement associated with the data point.

14. The thermal imaging camera system of claim 12, wherein the simulated three-dimensional plot is substantially spherical-shaped, and the processor is configured to control the display so that the three-dimensional plot rotates so as to display data points on different portions of the substantially spherical-shaped plot.

15. The thermal imaging camera system of claim 12, wherein the magnetic sensor comprises a three-axis magnetometer.

16. The thermal imaging camera system of claim 15, wherein the processor is configured to receive the plurality of measurements by at least receiving, for each of the plurality of data points, a first measurement associated with a first axis of the three-axis magnetometer, a second measurement associated with a second axis of the three-axis magnetometer, and a third measurement associated with a third axis of the three-axis magnetometer.

17. The thermal imaging camera system of claim 16, wherein the processor is configured to generate the plurality of data points from the plurality of measurements by at least associating, for each of the plurality of data points, the first measurement with the second measurement and the third measurement, the first, second, and third measurements each being captured at a same given time.

18. The thermal imaging camera system of claim 12, wherein each data point of the plurality of data points comprises a first coordinate based on a magnitude of the magnetic field in a first direction, a second coordinate based on the magnitude of the magnetic field in a second direction orthogonal to the first direction, and a third coordinate based on the magnetic field in a third direction orthogonal to the second direction.

19. The thermal imaging camera system of claim 12, wherein the processor is further configured to provide instructions instructing a user how to change the physical orientation of the thermal imaging camera so as to add data points to a portion of the simulated three-dimensional plot that is not populated with data points.

20. The thermal imaging camera system of claim 12, wherein the processor is further configured to provide instructions indicating that a user can stop changing the physical orientation of the thermal imaging camera in the three-dimensional space.

21. A non-transitory computer-readable medium comprising instructions that cause a programmable processor to:
receive a plurality of measurements from a magnetic sensor mounted in a thermal imaging camera as a physical orientation of the thermal imaging camera is changed in a three-dimensional space during a calibration routine, each of the plurality of measurements being representative of three orthogonal components of a magnetic field when the thermal imaging camera is in a given orientation;
generate a plurality of data points from the plurality of measurements during the calibration routine, each of the plurality of data points corresponding to one of the plurality of measurements representative of the three orthogonal components of the magnetic field; and
control a display so as to display a simulated three-dimensional plot of the data points that updates in substantially real-time during the calibration routine as new data points are generated by changing the physical orientation of the magnetic sensor.

22. The computer-readable medium of claim 21, wherein each data point of the plurality of data points comprises three coordinates, each coordinate corresponding to one of the orthogonal components of the magnetic field measurement associated with the data point.

23. The computer-readable medium of claim 21, wherein the simulated three-dimensional plot is substantially spherical-shaped, and the computer-readable medium further comprises instructions that cause the programmable processor to control the display so that the three-dimensional plot rotates so as to display data points on different portions of the substantially spherical-shaped plot.

24. The computer-readable medium of claim 21, wherein the computer-readable medium comprises instructions that cause the programmable processor to receive the plurality of measurements by at least receiving, for each of the plurality of data points, a first measurement associated with a first axis of a three-axis magnetometer, a second measurement associated with a second axis of the three-axis magnetometer, and a third measurement associated with a third axis of the three-axis magnetometer.

25. The computer-readable medium of claim 24, wherein the computer-readable medium comprises instructions that cause the programmable processor to generate the plurality of data points from the plurality of measurements by at least associating, for each of the plurality of data points, the first measurement with the second measurement and the third measurement, the first, second, and third measurements each being captured at a same given time.

26. The computer-readable medium of claim 21, further comprising instructions that cause the programmable processor to provide instructions instructing a user how to change the physical orientation of the thermal imaging camera so as to add data points to a portion of the simulated three-dimensional plot that is not populated with data points.

* * * * *